(12) United States Patent
McIntyre, II

(10) Patent No.: US 9,196,052 B1
(45) Date of Patent: Nov. 24, 2015

(54) SYSTEM FOR VIEWING CONTENTS IN A BURIAL VAULT

(71) Applicant: Raymond L. McIntyre, II, Valdosta, GA (US)

(72) Inventor: Raymond L. McIntyre, II, Valdosta, GA (US)

(*) Notice: Subject to any disclaimer, the term of this patent is extended or adjusted under 35 U.S.C. 154(b) by 0 days.

(21) Appl. No.: 13/860,969

(22) Filed: Apr. 11, 2013

(51) Int. Cl.
*E04H 13/00* (2006.01)
*G06T 7/20* (2006.01)

(52) U.S. Cl.
CPC .................................... *G06T 7/20* (2013.01)

(58) Field of Classification Search
CPC ...... E04H 13/00; E04H 13/001; A61G 17/00; A61G 17/02
USPC .................... 52/128–142; 27/2, 14, 16, 31
See application file for complete search history.

(56) References Cited

U.S. PATENT DOCUMENTS

| | | | |
|---|---|---|---|
| 6,324,736 B1* | 12/2001 | Atrio | 27/2 |
| 6,353,848 B1 | 3/2002 | Morris | |
| 6,567,122 B1 | 5/2003 | Anderson et al. | |
| 7,089,495 B2* | 8/2006 | Barrows | 715/717 |
| 7,093,396 B2* | 8/2006 | Pazar | 52/128 |
| 7,131,237 B2* | 11/2006 | Pazar | 52/138 |
| 7,286,158 B1 | 10/2007 | Griebenow | |
| 7,316,054 B2* | 1/2008 | Acton et al. | 27/2 |
| 7,657,981 B2* | 2/2010 | Parker | 27/19 |
| 7,661,179 B2* | 2/2010 | Parker et al. | 27/2 |
| 7,665,881 B2* | 2/2010 | Elam | 362/641 |
| 7,765,656 B2* | 8/2010 | Dannenberg | 27/31 |
| 7,778,880 B2 | 8/2010 | Seeley | |
| 8,046,882 B2* | 11/2011 | Rojdev | 27/10 |
| 2001/0036354 A1* | 11/2001 | Majors | 386/46 |
| 2003/0167706 A1* | 9/2003 | Pazar | 52/128 |
| 2003/0208890 A1* | 11/2003 | Kim | 27/31 |
| 2004/0020139 A1* | 2/2004 | Pazar | 52/128 |
| 2004/0021778 A1 | 2/2004 | Oldani et al. | |
| 2005/0192828 A1 | 9/2005 | Knippscheer et al. | |
| 2007/0009104 A1 | 1/2007 | Renkis | |
| 2007/0078566 A1 | 4/2007 | Wang et al. | |
| 2008/0106598 A1 | 5/2008 | Silva | |
| 2008/0209012 A1 | 8/2008 | Abujbara et al. | |
| 2009/0225164 A1 | 9/2009 | Renkis | |
| 2010/0146752 A1* | 6/2010 | Dannenberg | 27/2 |
| 2010/0158478 A1* | 6/2010 | Gomez, Jr. | 386/83 |
| 2010/0287749 A1* | 11/2010 | Rojdev | 27/1 |

* cited by examiner

*Primary Examiner* — Mark Wendell
(74) *Attorney, Agent, or Firm* — Richard L. Miller

(57) ABSTRACT

An improved burial vault of the type having a stationary portion including a floor panel, a pair of side panels extending upwardly from the floor panel of the stationary portion, a head piece extending upwardly from the floor panel of the stationary portion, a foot piece extending upwardly from the floor panel of the stationary portion, and an open top, and a pivoting portion including a lid pivotally attached to one side panel of the stationary portion. The improvement includes a camera. The improvement further includes the camera being disposed within the lid of the pivoting portion so as to allow remote viewing of the contents of the improved burial vault while the improved burial vault is partially buried in the ground so as to allow access and servicing of the camera.

40 Claims, 18 Drawing Sheets

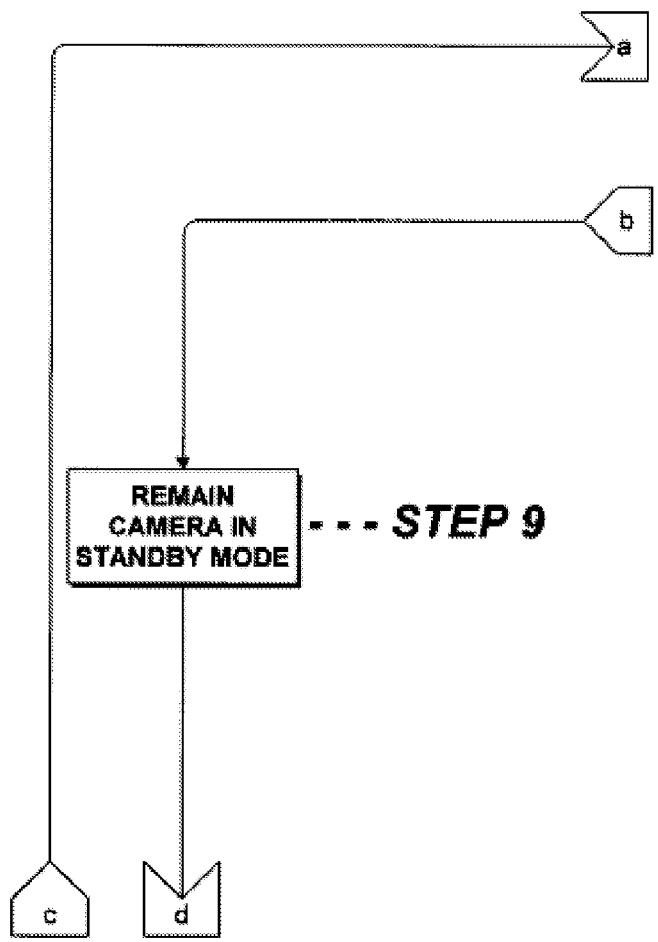
FIGURE 7-A

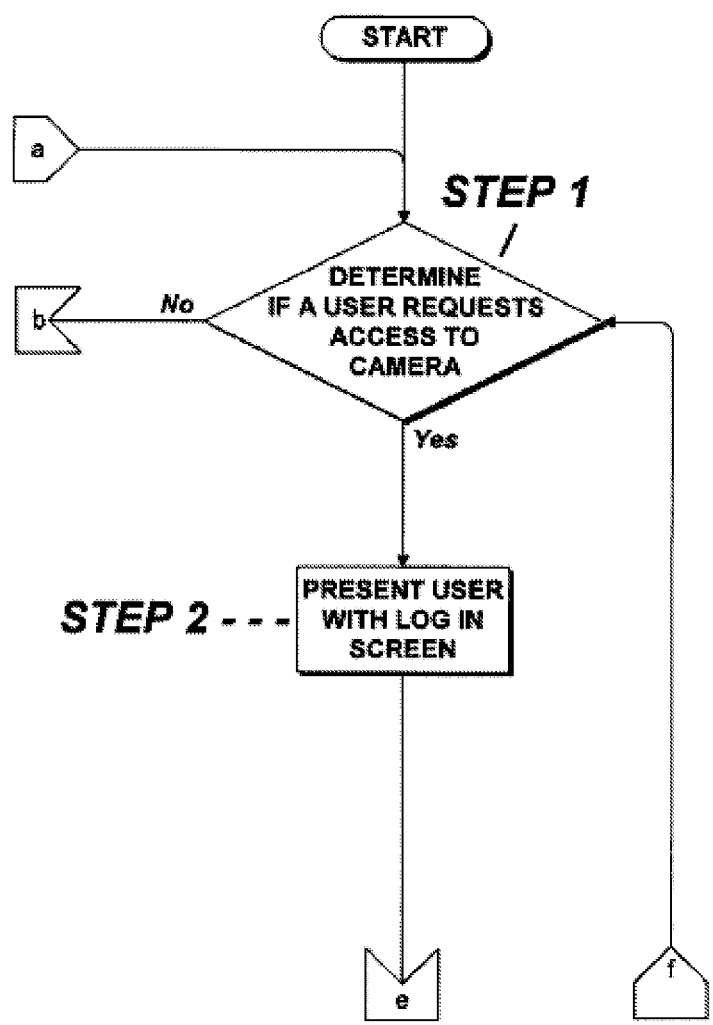

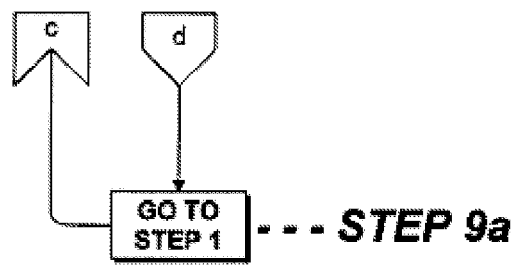
FIGURE 7-C

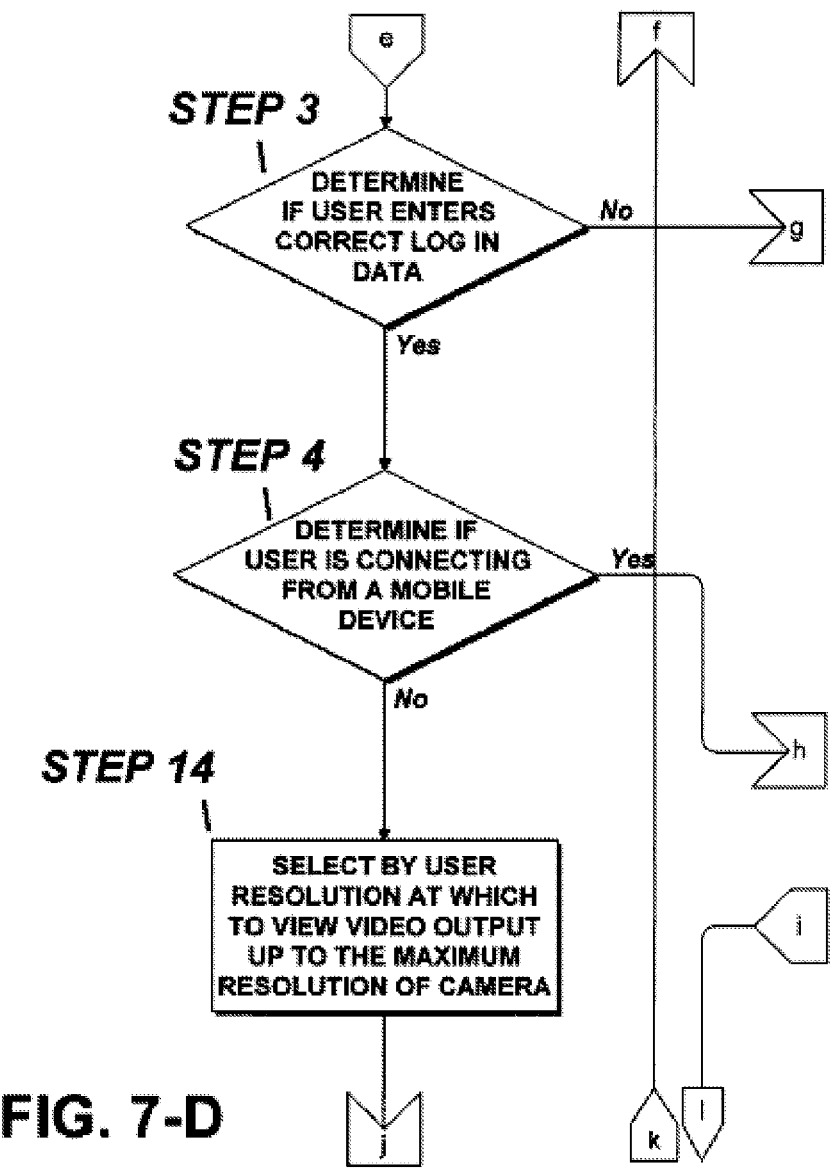
FIG. 7-D

FIGURE 7-E
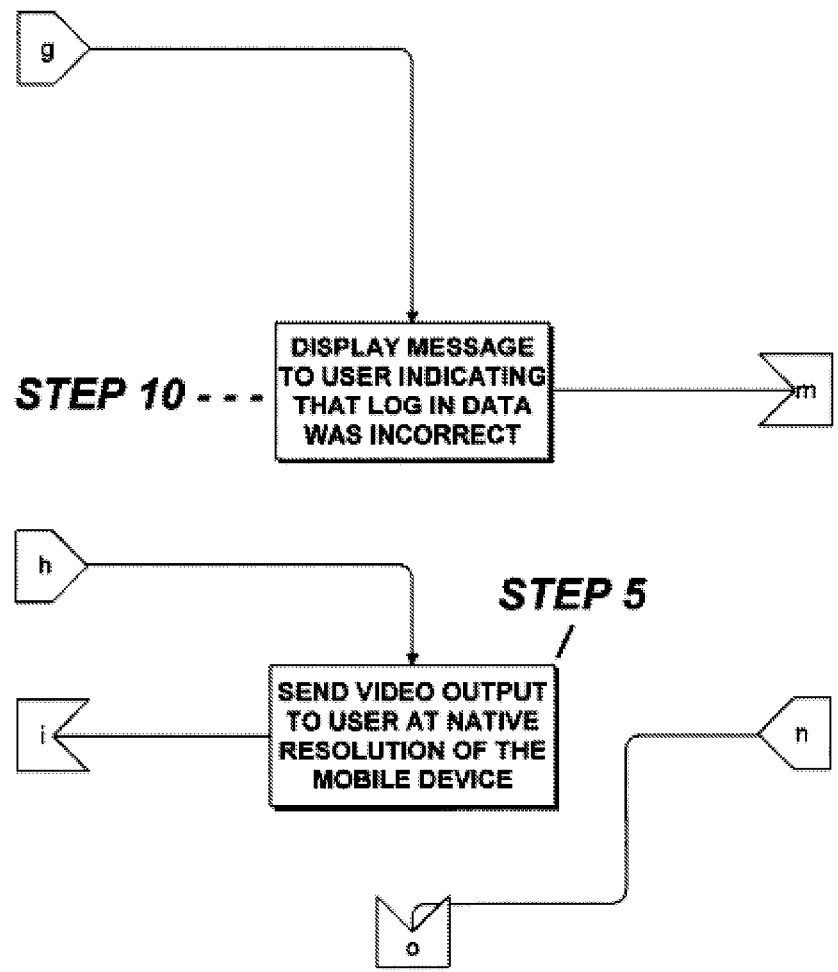

FIGURE 7-F
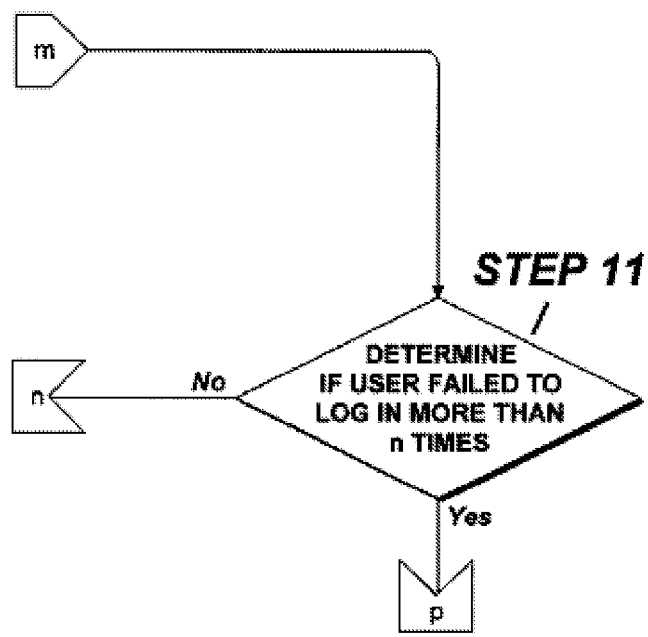

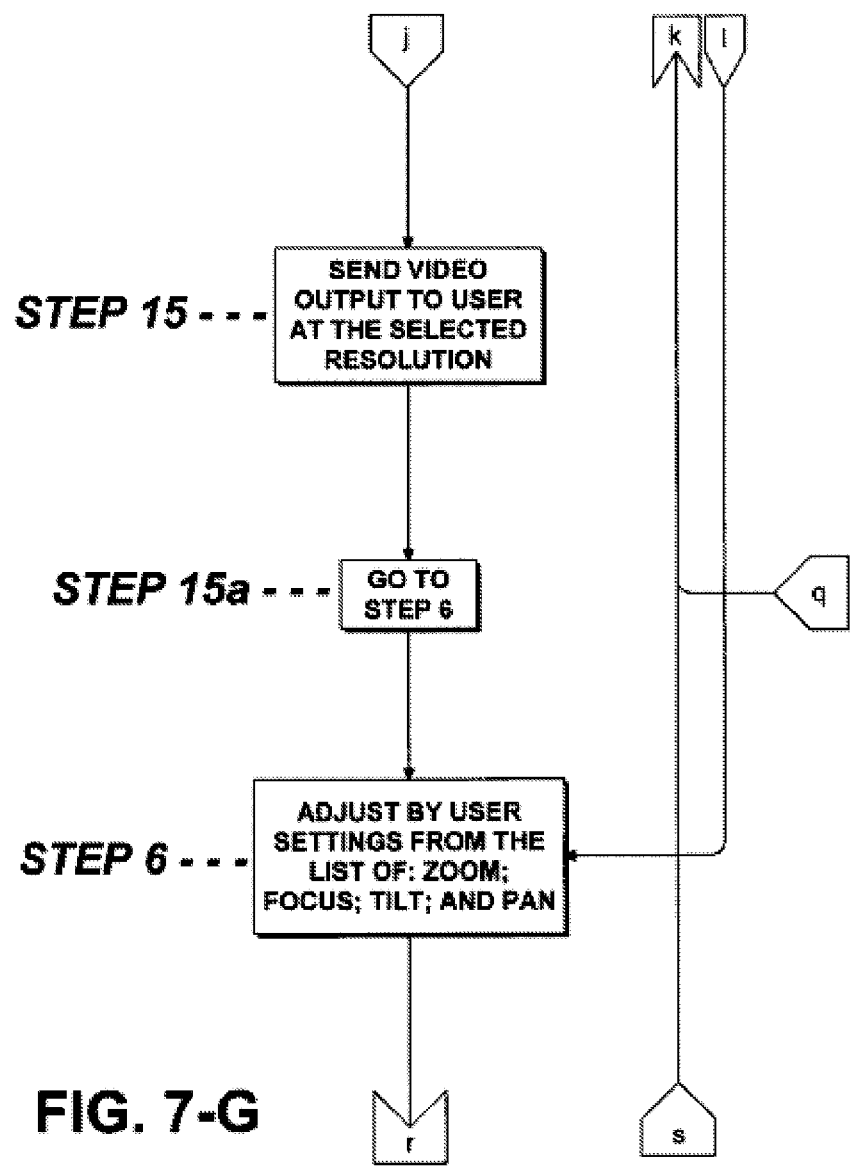
FIG. 7-G

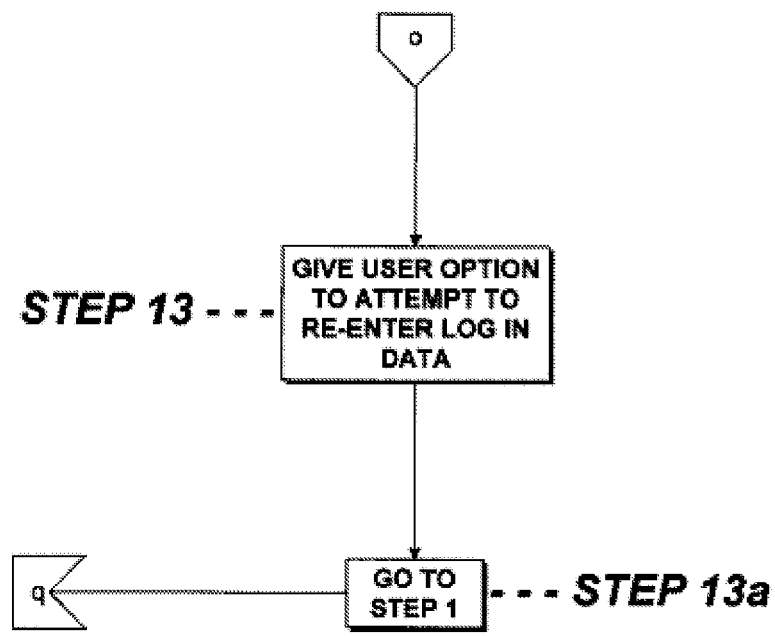
FIGURE 7-H

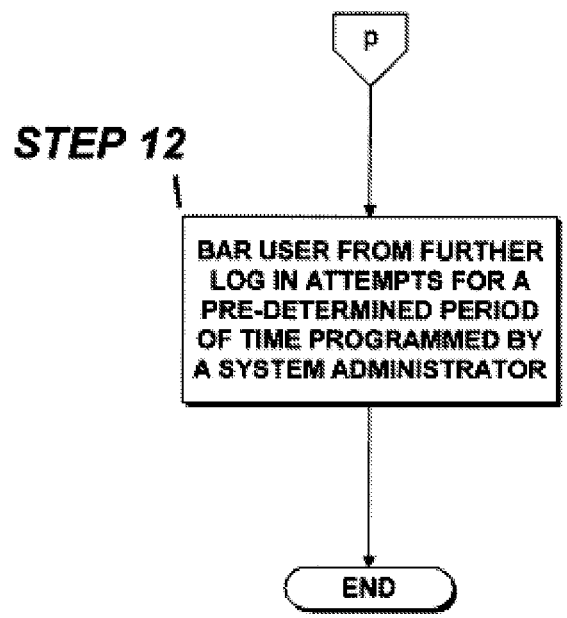
FIGURE 7-I

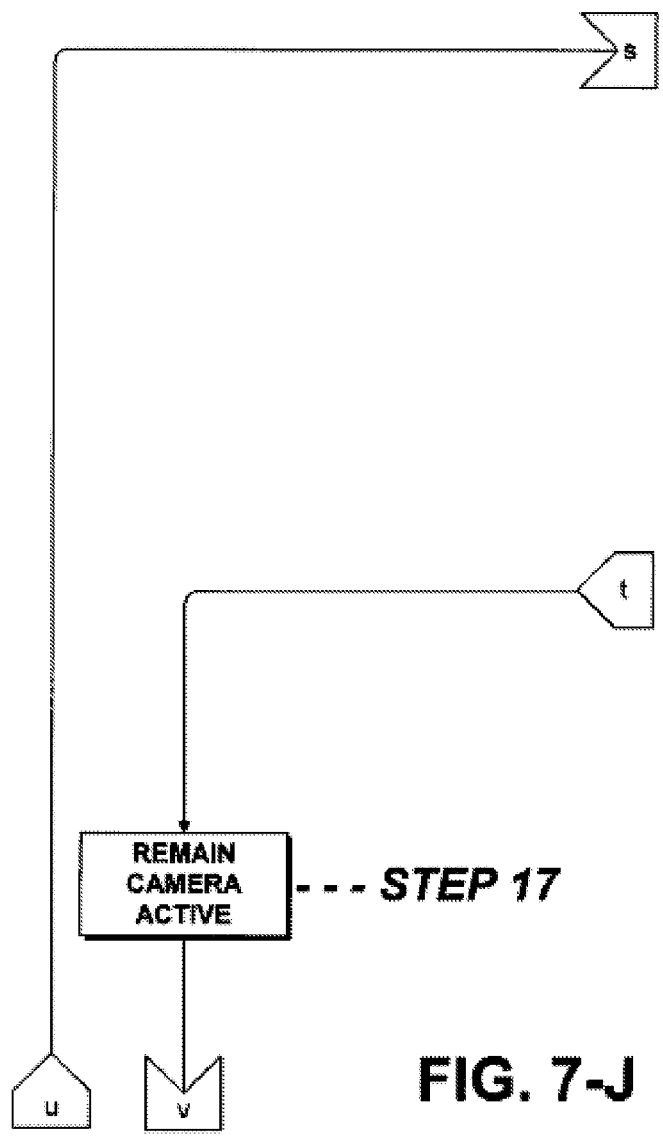
FIG. 7-J

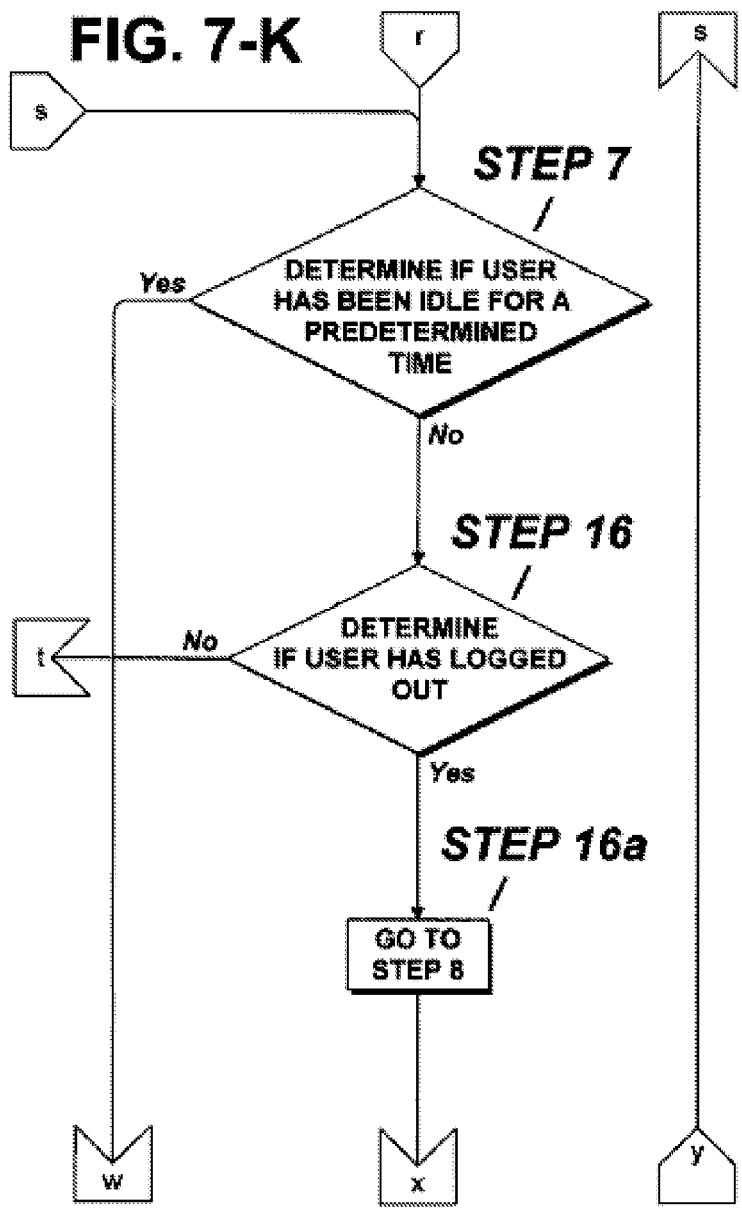

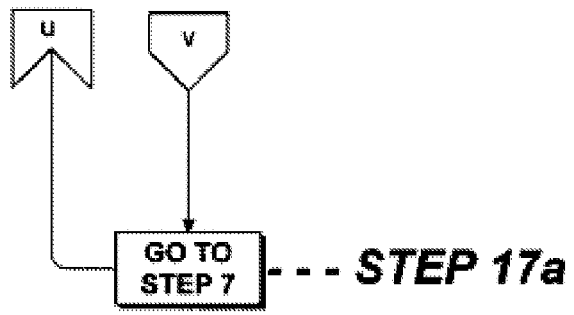
FIGURE 7-L

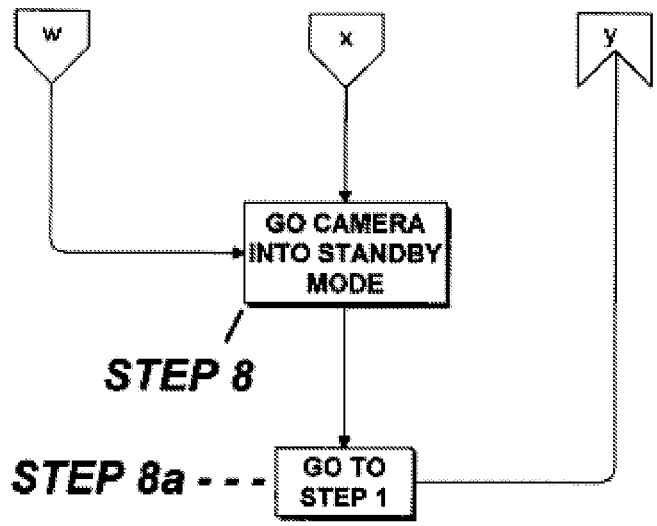
FIGURE 7-M

SYSTEM FOR VIEWING CONTENTS IN A BURIAL VAULT

1. BACKGROUND OF THE INVENTION

A. Field of the Invention

The embodiments of the present invention relate to a burial vault, and more particularly, the embodiments of the present invention relate to an improved burial vault for remotely viewing contents thereof and for being partially buried in the ground.

B. Description of the Prior Art

Numerous innovations for methods and systems for remotely accessing digital images have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach an improved burial vault for remotely viewing contents thereof and for being partially buried in the ground.

(1) U.S. Pat. No. 6,353,848 to Morris.

U.S. Pat. No. 6,353,848—issued to Morris on Mar. 5, 2002 in U.S. class 709 and subclass 203—teaches a method for accessing a digital image capture unit via a communication network, which includes a server computer system and a client computer system communicatively coupled with communication equipment. In one embodiment, the address of the digital image capture unit is registered in an executable program on the server computer system. The executable program is accessed by the client computer system. The executable program connects the digital image capture unit and the server computer system. The executable program communicates commands between the client computer system and the digital image capture unit so that data captured by the digital image capture unit is transferred to the client computer system via the server computer system.

(2) U.S. Pat. No. 6,567,122 to Anderson et al.

U.S. Pat. No. 6,567,122—issued to Anderson et al. on May 20, 2003 in U.S. class 348 and subclass 211.3—teaches a method and system for implementing internet access to images stored in a digital image capture unit, which includes an imaging device and a display. The image capture unit, e.g., a digital camera, is used to capture images and store them within its internal memory. The image capture unit accesses a ID server via the internet and registers its identity and internet address with the web server. A user subsequently accesses the image capture unit by entering the identity of the image capture unit into his web browser. The web browser, using standard internet protocols, then queries the ID server with the identity of the image capture unit and retrieves the internet address. The internet address is subsequently used to access a web page hosted by the image capture unit and display the web page to the user. The web page provides access to the stored images within the image capture unit.

(3) United States Patent Application Publication Number 2004/0021778 to Oldani et al.

United States Patent Application Publication Number 2004/0021778—published to Oldani et al. on Feb. 5, 2004 in U.S. class 348 and subclass 211.99—teaches a security system having at least one security camera structure, a remote control for the positioning and functioning for the lens of the camera, at least one security camera structure. The control, preferably, is done through the wide area computer service protocol.

(4) United States Patent Application Publication Number 2005/0192828 to Knippscheer et al.

United States Patent Application Publication Number 2005/0192828 published to Knippscheer et al. on Sep. 1, 2005 in U.S. class 705 and subclass 39—teaches a method of viewing the remains of a deceased individual organism in conjunction with selected visual and auditory stimulus to provide special emotional comfort to family members and friend, "survivors", by allowing them to view the remains at a time and place convenient to the survivor. The time of remembrance to take place directly in a survivor's home or at any place of their choice, i.e., vacation place, office, etc., and at their convenience, irrespective of the distance the survivor is from the actual physical location of the remains, the time of day, and the weather. The remote viewing of the remains eliminates traveling altogether, which is especially advantageous for very busy, or elderly, and handicapped people.

(5) United States Patent Application Publication Number 2007/0009104 to Renkis.

United States Patent Application Publication Number 2007/0009104—published to Renkis on Jan. 11, 2007 in U.S. class 380 and subclass 270—teaches a smart mesh network surveillance system and method for providing communication between a base system having at least one wireless input capture device ICD(s) and other ICD(s), wherein the ICD(s) are capable of smart cross-communication with each other and remote access to their inputs via a server computer, which includes the steps of providing the base system, at least one user accessing the ICDs and inputting remotely via a user interface through a remote server computer and/or electronic device communicating with it, wherein the captured data is represented visually on a user interface or screen views for the user. The screen views shows 2-dimensional data and corresponding 3-dimensional data of the same input capture with coordinate overlay to provide a geographic context for the captured data.

(6) United States Patent Application Publication Number 2007/0078566 to Wang et al.

United States Patent Application Publication Number 2007/0078566—published to Wang et al. on Apr. 5, 2007 in U.S. class 700 and subclass 259—teaches a remote controlled robot system that includes a mobile robot and a remote control station. A user controls movement of the robot from the remote control station. The mobile robot includes a camera system that captures and transmits to the remote station a zoom image and a non-zoom image. The remote control station includes a monitor that displays a robot view field. The robot view field displays the non-zoom image. The zoom image is displayed in the robot view field by highlighting an area of the non-zoom field. The remote control station also store camera locations that allow a user to move the camera system to preset locations.

(7) U.S. Pat. No. 7,286,158 to Griebenow.

U.S. Pat. No. 7,286,158—issued to Griebenow on Oct. 23, 2007 in U.S. class 348 and subclass 156—teaches a method and system for providing integrated remote monitoring services, which includes receiving and storing radio frequency identification (RFID) data from an RFID system at a remote facility of a subscriber. Video data is received from a video system at the facility and also stored. The subscriber is provided with access to the stored RFID and video data. The subscriber is also provided with access to and control of a video camera in the video system at the facility.

(8) United States Patent Application Publication Number 2008/0106598 to Silva.

United States Patent Application Publication Number 2008/0106598—published to Silva on May 8, 2008 in U.S.

class 348 and subclass 143—teaches a system for allowing remote viewing of a particularized item located within a plurality of items, such as a particular gravesite within a cemetery. In particular, the system includes at least one viewing device that is operatively connected to a host control device. The combination of items is configured and capable of capturing pictures from a designated location when activated by a host control device and transmitting a signal carrying particular images from the preselected destination to a designated remote location. The access, images, and distribution of the images all operate under the control of the host control device.

(9) United States Patent Application Publication Number 2008/0209012 to Abujbara et al.

United States Patent Application Publication Number 2008/0209012—published to Abujbara et al. on Aug. 28, 2008 in U.S. class 709 and subclass 219—teaches a method and apparatus for remotely accessing a device over a network. The method and apparatus includes connecting by a first device to a server over a network for communication with a second device over the network, sending a request for remote access from the first device to the second device over the network by utilizing information provided by the server, and storing by the second device remote access data in an image file. The remote access data stored includes information to remotely access the second device or resources of the second device over the network. Further including sending the image file with the remote access data to the first device over the network and accessing by the first device the second device or resources connected to the second device over using the remote access data stored in the image file.

(10) United States Patent Application Publication Number 2009/0225164 to Renkis.

United States Patent Application Publication Number 2009/0225164—published to Renkis on Sep. 10, 2009 in U.S. class 348 and subclass 143—teaches systems and methods having a 3D model of a space provides a 3D context for the inputs from the ICDs. Inputs from the ICDs including direct cross-communication information, location, settings, environment conditions, and inputs (video, audio, temperature, other sensors), are visually represented on a GUI independently and in the 3D context for simultaneous display of all the info, and analytics based on the info including activity density within the 3D context based on the inputs for surveillance and analysis of target environment(s).

(11) U.S. Pat. No. 7,778,880 to Seeley.

U.S. Pat. No. 7,778,880—issued to Seeley on Aug. 17, 2010 in U.S. class 705 and subclass 26.35—teaches remote access to a computerized inventory, which includes images of items stored in a storage unit that is assigned to a customer is provided so that the customer may view the images of the stored items. The remote access further allows the customer to select particular items according to the images and send instructions to a storage facility representative concerning those selected items.

It is apparent that numerous innovations for methods and systems for remotely accessing digital images have been provided in the prior art, which are adapted to be used. Furthermore, even though these innovations may be suitable for the specific individual purposes to which they address, nevertheless, they would not be suitable for the purposes of the embodiments of the present invention as heretofore described, namely, an improved burial vault for remotely viewing contents thereof and for being partially buried in the ground.

2. SUMMARY OF THE INVENTION

Thus, an object of the embodiments of the present invention is to provide an improved burial vault for remotely viewing contents thereof and for being partially buried in the ground, which avoids the disadvantages of the prior art.

Briefly stated, another object of the embodiments of the present invention is to provide an improved burial vault of the type having a stationary portion including a floor panel, a pair of side panels extending upwardly from the floor panel of the stationary portion, a head piece extending upwardly from the floor panel of the stationary portion, a foot piece extending upwardly from the floor panel of the stationary portion, and an open top, and a pivoting portion including a lid pivotally attached to one side panel of the stationary portion. The improvement includes a camera. The improvement further includes the camera being disposed within the lid of the pivoting portion so as to allow remote viewing of the contents of the improved burial vault while the improved burial vault is partially buried in the ground so as to allow access and servicing of the camera.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows:

FIGS. 7A-7M are a flow chart of the method of operation of the camera of the improved burial vault of the embodiments of the present invention.

4. LIST OF REFERENCE NUMERALS UTILIZED IN THE FIGURES OF THE DRAWING

Figure 1:
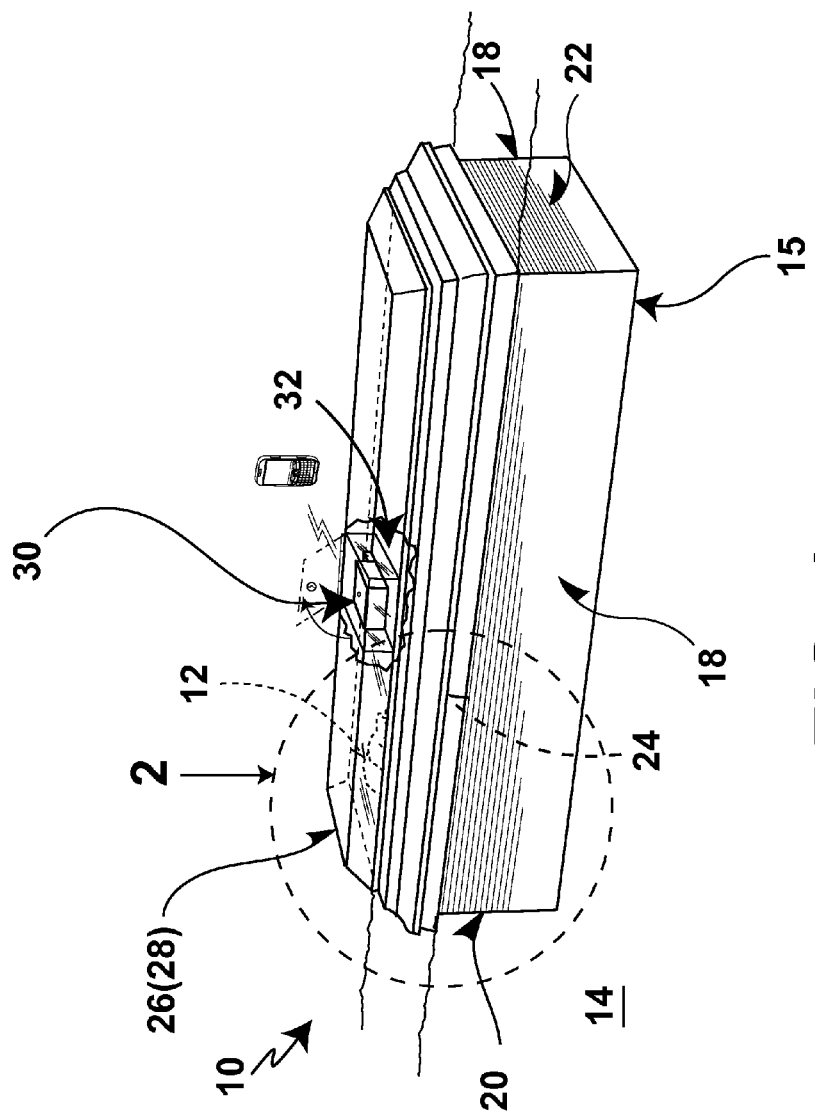
FIG. 1 is a diagrammatic perspective view of the improved burial vault of the embodiments of the present invention remotely viewing contents thereof and partially buried in the ground.

A. Introductory.
10 improved burial vault of embodiments of present invention for remotely viewing contents 12 thereof and for being partially buried in ground 14
12 contents of improved burial vault 10
14 ground
B. Configuration of Improved Burial Vault 10.
15 stationary portion
16 floor panel of stationary portion 15
18 pair of side panels of stationary portion 15
20 head piece of stationary portion 15
22 foot piece of stationary portion 15

24 open top of stationary portion 15
26 pivoting portion
28 lid of pivoting portion 26
30 camera
32 shelf
34 opaque portion of shelf 32
36 transparent portion of shelf 32
40 sealed glass of transparent portion 36 of shelf 32
C. Specific Configuration of Camera 30.
42 close-circuit camera of camera 30
44 housing of close-circuit camera 42 of camera 30
46 electric power source interface of close-circuit camera 42 of camera 30
48 batteries of electric power source interface 46 of close-circuit camera 42 of camera 30
50 optical settings controller of close-circuit camera 42 of camera 30
52 "zoom" control of optical settings controller 50 of close-circuit camera 42 of camera 30
54 "focus" control of optical settings controller 50 of close-circuit camera 42 of camera 30
56 "tilt" control of optical settings controller 50 of close-circuit camera 42 of camera 30
58 "pan" control of optical settings controller 50 of close-circuit camera 42 of camera 30
60 digital image capture sensor of close-circuit camera 42 of camera 30
62 graphics processing unit of close-circuit camera 42 of camera 30
64 CPU of close-circuit camera 42 of camera 30
66 memory of close-circuit camera 42 of camera 30
68 modem of close-circuit camera 42 of camera 30
70 system firmware of close-circuit camera 42 of camera 30
72 antenna of close-circuit camera 42 of camera 30
74 personal computer of user
76 internet
78 mobile device of a user
80 cellular telephony data network

5. DETAILED DESCRIPTION OF THE PREFERRED EMBODIMENTS

A. Introductory.

Figure 2:
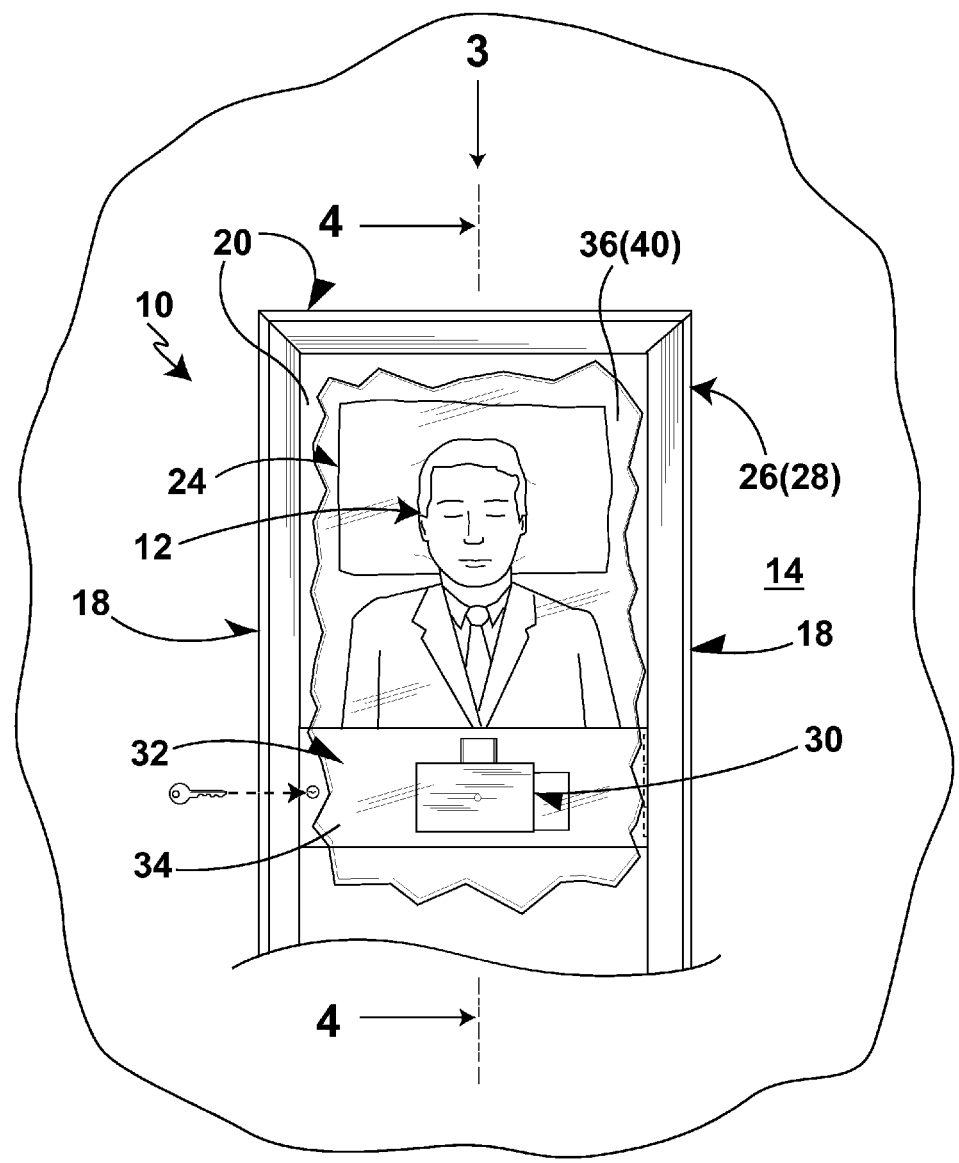
FIG. 2 is an enlarged diagrammatic top plan view of the area generally enclosed by the dotted curve identified by ARROW 2 in FIG. 1.
Figure 3:
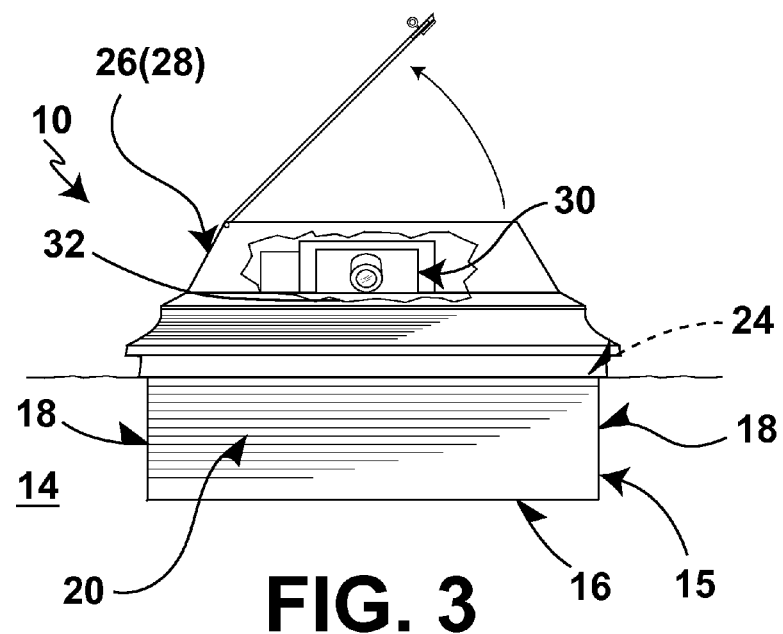
FIG. 3 is an enlarged diagrammatic end view taken generally in the direction of ARROW 3 in FIG. 2.

Referring now to the figures, in which like numerals indicate like parts, and particularly to FIGS. 1 and 2, which are, respectively, a diagrammatic perspective view of the improved burial vault of the embodiments of the present invention remotely viewing contents thereof and partially buried in the ground, and an enlarged diagrammatic top plan view of the area generally enclosed by the dotted curve identified by ARROW 2 in FIG. 1, the improved burial vault of the embodiments of the present invention is shown generally at 10 for remotely viewing contents 12 thereof and for being partially buried in the ground 14.

B. Configuration of the Improved Burial Vault 10.

Figure 4:
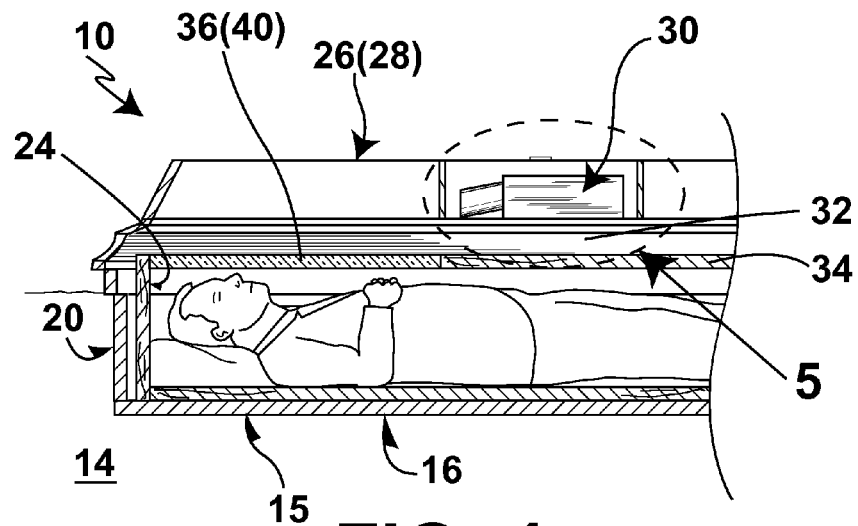
FIG. 4 is a reduced diagrammatic cross sectional view taken along LINE 4-4 in FIG. 2.
Figure 5:
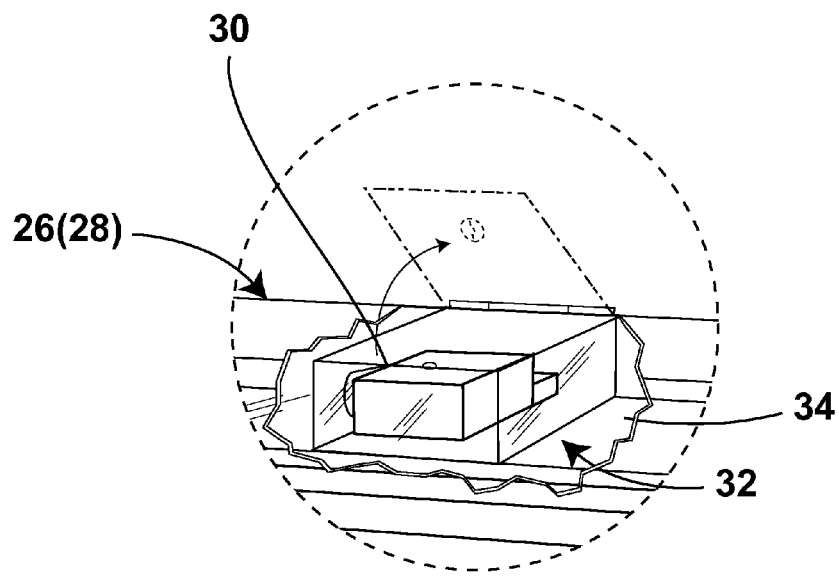
FIG. 5 is an enlarged diagrammatic perspective view of the area generally enclosed by the dotted curve identified by ARROW 5 in FIG. 4.

The configuration of the improved burial vault 10 can best be seen in FIGS. 1-5, which are, respectively, again, a diagrammatic perspective view of the improved burial vault of the embodiments of the present invention remotely viewing contents thereof and partially buried in the ground, again, an enlarged diagrammatic top plan view of the area generally enclosed by the dotted curve identified by ARROW 2 in FIG. 1, an enlarged diagrammatic end view taken generally in the direction of ARROW 3 in FIG. 2, a reduced diagrammatic cross sectional view taken along LINE 4-4 in FIG. 2, and an enlarged diagrammatic perspective view of the area generally enclosed by the dotted curve identified by ARROW 5 in FIG. 4, and as such, will be discussed with reference thereto.

The improved burial vault 10 is of the type having a stationary portion 15 including a floor panel 16, a pair of side panels 18 extending upwardly from the floor panel 16 of the stationary portion 15, a head piece 20 extending upwardly from the floor panel 16 of the stationary portion 15, a foot piece 22 extending upwardly from the floor panel 16 of the stationary portion 15, and an open top 24, and a pivoting portion 26 including a lid 28 pivotally attached to one side panel 18 of the stationary portion 15.

The improvement comprises a camera 30.

The improvement further comprises the camera 30 being disposed within the lid 28 of the pivoting portion 26 so as to allow remote viewing of the contents 12 of the improved burial vault 20 while the improved burial vault 10 is partially buried in the ground 14 so as to allow access and servicing of the camera 26.

The improvement further comprises a shelf 32.

The improvement further comprises the shelf 32 closing off the open top 24 of the stationary portion 15.

The improvement further comprises the shelf 32 having an opaque portion 34 and a transparent portion 36.

The improvement further comprises the camera 30 being mounted onto the opaque portion 34 of the shelf 32.

The improvement further comprises the camera 30 focusing through the transparent portion 36 of the shelf 32 so as to allow viewing of the contents 12 of the improved burial vault 20.

The improvement further comprises the transparent portion 36 of the shelf 32 being sealed glass 40.

The improvement further comprises the improved burial vault 10 being made of a material selected from the group consisting of concrete, steel, marble, granite, and bronze.

C. Specific Configuration of the Camera 30.

Figure 6:
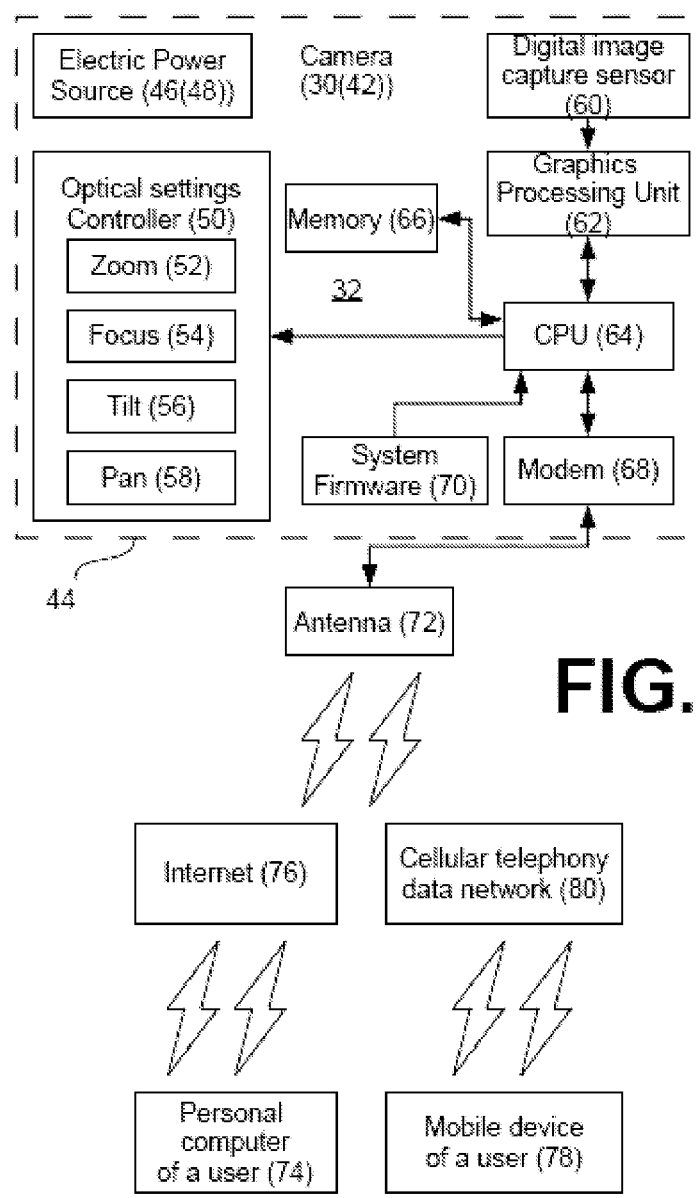
FIG. 6 is a diagrammatic block diagram of the camera of the improved burial vault of the embodiments of the present invention.

The specific configuration of the camera 30 can best be seen in FIG. 6, which is a diagrammatic block diagram of the camera of the improved burial vault of the embodiments of the present invention, and as such, will be discussed with reference thereto.

The improvement further comprises the camera 30 being a close-circuit camera 42.

The improvement further comprises the close-circuit camera 42 of the camera 30 having a housing 44.

The improvement further comprises the housing 44 of the close-circuit camera 42 of the camera 30 being mounted onto the opaque portion 34 of the shelf 32.

The improvement further comprises the close-circuit camera 42 of the camera 30 having an electric power source interface 46.

The improvement further comprises the electric power source interface 46 of the close-circuit camera 42 of the camera 30 interfacing with batteries 48 to power the close-circuit camera 42 of the camera 30.

The improvement further comprises the close-circuit camera 42 of the camera 30 having an optical settings controller 50.

The improvement further comprises the optical settings controller 50 of the close-circuit camera 42 of the camera 30 having a "zoom" control 52.

The improvement further comprises the optical settings controller 50 of the close-circuit camera 42 of the camera 30 having a "focus" control 54.

The improvement further comprises the optical settings controller 50 of the close-circuit camera 42 of the camera 30 having a "tilt" control 56.

The improvement further comprises the optical settings controller 50 of the close-circuit camera 42 of the camera 30 having a "pan" control 58.

The improvement further comprises the close-circuit camera 42 of the camera 30 having a digital image capture sensor 60.

The improvement further comprises the close-circuit camera 42 of the camera 30 having a graphics processing unit 62.

The improvement further comprises the digital image capture sensor 60 of the close-circuit camera 42 of the camera 30 being in unidirectional communication with the graphics processing unit 62 of the close-circuit camera 42 of the camera 30.

The improvement further comprises the close-circuit camera 42 of the camera 30 having a CPU 64.

The improvement further comprises the CPU 64 of the close-circuit camera 42 of the camera 30 being in bidirectional communication with the graphics processing unit 62 of the close-circuit camera 42 of the camera 30.

The improvement further comprises the CPU 64 of the close-circuit camera 42 of the camera 30 being in unidirectional communication with the optical settings controller 50 of the close-circuit camera 42 of the camera 30.

The improvement further comprises the close-circuit camera 42 of the camera 30 having a memory 66.

The improvement further comprises the memory 66 of the close-circuit camera 42 of the camera 30 being in bidirectional communication with the CPU 64 of the close-circuit camera 42 of the camera 30.

The improvement further comprises the close-circuit camera 42 of the camera 30 having a modem 68.

The improvement further comprises the modem 68 of the close-circuit camera 42 of the camera 30 being in bidirectional communication with the CPU 64 of the close-circuit camera 42 of the camera 30.

The improvement further comprises the close-circuit camera 42 of the camera 30 having system firmware 70.

The improvement further comprises the system firmware 70 of the close-circuit camera 42 of the camera 30 being in unidirectional communication with the CPU 64 of the close-circuit camera 42 of the camera 30.

The improvement further comprises the close-circuit camera 42 of the camera 30 having an antenna 72.

The improvement further comprises the antenna 72 of the close-circuit camera 42 of the camera 30 being in bidirectional communication with the modem 68 of the close-circuit camera 42 of the camera 30.

The improvement further comprises the antenna 72 of the close-circuit camera 42 of the camera 30 wirelessly communicating with a personal computer of a user 74.

The improvement further comprises the personal computer of a user 74 operating the close-circuit camera 42 of the camera 30.

The improvement further comprises the personal computer of a user 74 operating the close-circuit camera 42 of the camera 30 via a specifically known code.

The improvement further comprises the antenna 72 of the close-circuit camera 42 of the camera 30 wirelessly communicating with the personal computer of a user 74 via the internet 76.

The improvement further comprises the antenna 72 of the close-circuit camera 42 of the camera 30 wirelessly communicating with a mobile device of a user 78.

The improvement further comprises the mobile device of a user 78 operating the close-circuit camera 42 of the camera 30.

The improvement further comprises the mobile device of a user 78 operating the close-circuit camera 42 of the camera 30 via a specifically known telephone number.

The improvement further comprises the antenna 72 of the close-circuit camera 42 of the camera 30 wirelessly communicating with the mobile device of a user 78 via a cellular telephony data network 80.

The improvement further comprises the close-circuit camera 42 of the camera 30 being replaceably mounted to the shelf 32 for servicing.

The improvement further comprises the batteries 48 of the electric power source interface 46 of the close-circuit camera 42 of the camera 30 being replaceably attached thereto for charging.

D. Method of Operating the Camera 30.

The method of operating the camera 30 can best be seen in FIGS. 7A-7M, which are a flow chart of the method of operation of the camera of the improved burial vault of the embodiments of the present invention, and as such, will be discussed with reference thereto.

The method of operating the camera 30 comprises the steps of:

STEP 1: Determining if a user requests access to camera.

STEP 2: Presenting user with log in screen, if answer to STEP 1 is yes.

STEP 3: Determining if user enters correct log in data, if STEP 2 is carried out.

STEP 4: Determining if user is connecting from a mobile device, if answer to STEP 3 is yes.

STEP 5: Sending video output to user at native resolution of the mobile device, if answer to STEP 4 is yes.

STEP 6: Adjusting by user settings from the list of: zoom; focus; tilt; and pan, if STEP 5 is carried out.

STEP 7: Determining if user has been idle for a predetermined time, if STEP 6 is carried out.

STEP 8: Going camera into standby mode, if answer to STEP 7 is yes.

STEP 8A: Going to STEP 1, if STEP 8 is carried out.

STEP 9: Remaining camera in standby mode, if answer to STEP 1 is no.

STEP 9A: Going to STEP 1, if STEP 9 is carried out.

STEP 10: Displaying message to user indicating that log in data was incorrect, if answer to STEP 3 is no.

STEP 11: Determining if user failed to log in more than n times, if STEP 10 is carried out.

STEP 12: Baring user from further log in attempts for a pre-determined period of time programmed by a system administrator, if answer to STEP 11 is yes.

STEP 13: Giving user option to attempt to re-enter log in data, if answer to STEP 11 is no.

STEP 13A: Going to STEP 1, if STEP 13 is carried out.

STEP 14: Selecting by user resolution at which to view video output up to the maximum resolution of camera, if answer to STEP 4 is no.

STEP 15: Sending video output to user at the selected resolution, if STEP 14 is carried out.

STEP 15A: Going to STEP 6, if STEP 15 is carried out.

STEP 16: Determining if user has logged out, if answer to STEP 7 is no.

STEP 16A: Going to STEP 8, if answer to STEP 16 is yes.

STEP 17: Remaining camera active, if answer to STEP 16 is no.

STEP 17A: Going to STEP 7, if STEP 17 is carried out.

E. Impressions.

It will be understood that each of the elements described above or two or more together may also find a useful application in other types of constructions differing from the types described above.

While the embodiments of the present invention have been illustrated and described as embodied in an improved burial vault for remotely viewing contents thereof and for being partially buried in the ground, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. An improved burial vault having a stationary portion including a floor panel, a pair of side panels extending upwardly from the floor panel of the stationary portion, a head piece extending upwardly from the floor panel of the stationary portion, a foot piece extending upwardly from the floor panel of the stationary portion, and an open top, and a pivoting portion including a lid pivotally attached to one side panel of the stationary portion, wherein said improvement comprises a camera; and
   wherein said improvement further comprises said camera being disposed within the lid of the pivoting portion so as to allow remote viewing of the contents of said improved burial vault while said improved burial vault is partially buried in the ground so as to allow access and servicing of said camera;
   wherein said improvement further comprises a shelf;
   wherein said improvement further comprises said shelf having:
   a) an opaque portion; and
   b) a transparent portion.

2. The improved burial vault of claim 1, wherein said improvement further comprises said shelf closing off said open top of said stationary portion.

3. The improved burial vault of claim 1, wherein said improvement further comprises said camera being mounted onto said opaque portion of said shelf.

4. The improved burial vault of claim 1, wherein said improvement further comprises said camera focusing through said transparent portion of said shelf so as to allow viewing of said contents of said improved burial vault.

5. The improved burial vault of claim 1, wherein said improvement further comprises said transparent portion of said shelf being sealed glass.

6. The improved burial vault of claim 1, wherein said improvement further comprises said improved burial vault being made of a material selected from the group consisting of concrete, steel, marble, granite, and bronze.

7. The improved burial vault of claim 1, wherein said improvement further comprises said camera being a close-circuit camera.

8. The improved burial vault of claim 7, wherein said improvement further comprises said close-circuit camera of said camera having a housing.

9. The improved burial vault of claim 8, wherein said improvement further comprises said housing of said close-circuit camera of said camera being mounted onto said opaque portion of said shelf.

10. The improved burial vault of claim 7, wherein said improvement further comprises said close-circuit camera of said camera having an electric power source interface.

11. The improved burial vault of claim 10, wherein said improvement further comprises said electric power source interface of said close-circuit camera of said camera interfacing with batteries to power said close-circuit camera of said camera.

12. The improved burial vault of claim 11, wherein said improvement further comprises the batteries of said electric power source interface of said close-circuit camera of said camera being replaceably attached thereto for charging.

13. The improved burial vault of claim 7, wherein said improvement further comprises said close-circuit camera of said camera having an optical settings controller.

14. The improved burial vault of claim 13, wherein said improvement further comprises said optical settings controller of said close-circuit camera of said camera having a "zoom" control.

15. The improved burial vault of claim 13, wherein said improvement further comprises said optical settings controller of said close-circuit camera of said camera having a "focus" control.

16. The improved burial vault of claim 13, wherein said improvement further comprises said optical settings controller of said close-circuit camera of said camera having a "tilt" control.

17. The improved burial vault of claim 13, wherein said improvement further comprises said optical settings controller of said close-circuit camera of said camera having a "pan" control.

18. The improved burial vault of claim 13, wherein said improvement further comprises said close-circuit camera of said camera having a digital image capture sensor.

19. The improved burial vault of claim 18, wherein said improvement further comprises said close-circuit camera of said camera having a graphics processing unit.

20. The improved burial vault of claim 19, wherein said improvement further comprises said digital image capture sensor of said close-circuit camera of said camera being in unidirectional communication with said graphics processing unit of said close-circuit camera of said camera.

21. The improved burial vault of claim 19, wherein said improvement further comprises said close-circuit camera of said camera having a CPU.

22. The improved burial vault of claim 21, wherein said improvement further comprises said CPU of said close-circuit camera of said camera being in bidirectional communication with said graphics processing unit of said close-circuit camera of said camera.

23. The improved burial vault of claim 21, wherein said improvement further comprises said CPU of said close-circuit camera of said camera being in unidirectional communication with said optical settings controller of said close-circuit camera of said camera.

24. The improved burial vault of claim 21, wherein said improvement further comprises said close-circuit camera of said camera having a memory.

25. The improved burial vault of claim 24, wherein said improvement further comprises said memory of said close-circuit camera of said camera being in bidirectional communication with said CPU of said close-circuit camera of said camera.

26. The improved burial vault of claim 21, wherein said improvement further comprises said close-circuit camera of said camera having a modem.

27. The improved burial vault of claim 26, wherein said improvement further comprises said modem of said close-circuit camera of said camera being in bidirectional communication with said CPU of said close-circuit camera of said camera.

28. The improved burial vault of claim 21, wherein said improvement further comprises said close-circuit camera of said camera having system firmware.

29. The improved burial vault of claim 28, wherein said improvement further comprises said system firmware of said close-circuit camera of said camera being in unidirectional communication with said CPU of said close-circuit camera of said camera.

30. The improved burial vault of claim 21, wherein said improvement further comprises said close-circuit camera of said camera having an antenna.

31. The improved burial vault of claim 30, wherein said improvement further comprises said antenna of said close-circuit camera of said camera being in bidirectional communication with said modem of said close-circuit camera of said camera.

32. The improved burial vault of claim 30, wherein said improvement further comprises said antenna of said close-circuit camera of said camera wirelessly communicating with a personal computer of a user.

33. The improved burial vault of claim 32, wherein said improvement further comprises said personal computer of a user operating said close-circuit camera of said camera.

34. The improved burial vault of claim 32, wherein said improvement further comprises said personal computer of a user operating said close-circuit camera of said camera via a specifically known code.

35. The improved burial vault of claim 30, wherein said improvement further comprises said antenna of said close-circuit camera of said camera wirelessly communicating with the personal computer of a user via the internet.

36. The improved burial vault of claim 30, wherein said improvement further comprises said antenna of said close-circuit camera of said camera wirelessly communicating with a mobile device of a user.

37. The improved burial vault of claim 36, wherein said improvement further comprises said mobile device of a user operating said close-circuit camera of said camera.

38. The improved burial vault of claim 36, wherein said improvement further comprises said mobile device of a user operating said close-circuit camera of said camera via a specifically known telephone number.

39. The improved burial vault of claim 36, wherein said improvement further comprises said antenna of said close-circuit camera of said camera wirelessly communicating with said mobile device of a user via a cellular telephony data network.

40. The improved burial vault of claim 7, wherein said improvement further comprises said close-circuit camera of said camera being replaceably mounted to said shelf for servicing.

* * * * *